Oct. 27, 1953     W. D. MOORE     2,656,818
APPARATUS FOR MEASURING RELATIVE ANGULAR MOVEMENTS
Filed Sept. 13, 1948     2 Sheets—Sheet 1

Inventor
WILLIAM D. MOORE
By Fishburn & Mullendore
Attorneys

Oct. 27, 1953  W. D. MOORE  2,656,818
APPARATUS FOR MEASURING RELATIVE ANGULAR MOVEMENTS
Filed Sept. 13, 1948  2 Sheets-Sheet 2

Inventor
WILLIAM D. MOORE

By Fishburn & Mullendore
Attorneys

Patented Oct. 27, 1953

2,656,818

UNITED STATES PATENT OFFICE 2,656,818

APPARATUS FOR MEASURING RELATIVE ANGULAR MOVEMENTS

William D. Moore, Kansas City, Mo., assignor to Brunson Instrument Co., Kansas City, Mo., a corporation of Missouri Application September 13, 1948, Serial No. 48,957

4 Claims. (Cl. 116—115.5)

This invention relates to apparatus for measuring relative angular movement and more particularly to the determination of angular movement of relatively rotatable members by linear measurement and translating same to circular measurement.

The principal object of the invention is to provide an arrangement of relatively rotatable members having a reference point and a surface whereby relative rotation changes the linear spacing therebetween and apparatus for accurately measuring the change and indicating same on meters calibrated to give the relative angular movement in circular measurements.

It is common practice to provide protractors or fixed scales calibrated in degrees on relatively rotatable members for example limbs on instruments such as surveyors' transits for direct reading of relative angular movement of the selected parts of the instrument or other devices. It is hard to determine quickly the accurate position of a pointer on a finely divided scale. Therefore verniers are frequently used to enable the operator to interpolate the position of a pointer or index line between any two scale graduations. Even with verniers considerable time is required in making readings, and said readings are subject to error both due to inaccuracy of calibrating in the manufacture and in the use of the instrument due to the necessity of determining the alignment or coincidence of graduated lines or markings on the devices. In small instruments the width of said graduated lines can cause considerable error.

The present invention contemplates a new method of measuring relative angular movements in which the procedure in making readings is greatly simplified and the speed and accuracy thereof, is materially increased. In accordance with the invention a surface is arranged relative to a reference point whereby relative rotation effects a change in the linear distance therebetween. The change in linear distance is measured and recorded on a dial instrument or other meter which is graduated in increments of angular movement. Various instruments may be used, for example instruments having a reed or spindle adapted to contact the surface and operate a pointer in response to movement thereof. Such instruments preferably have suitable devices for amplifying the slight difference in linear measurement or displacement of the gauging point to enlarge the indication of said measurement, said device preferably including a dial graduated in units of circular measurement such as mills, grads or degrees and fractions thereof, for example minutes and seconds. Also electronic instruments capable of measuring linear distance between said relatively rotatable reference point and surface and having suitable meters for indicating the distance on a dial graduated units of circular measurements may be used. Electronic instruments capable of directing a beam or otherwise measuring the air gap between the reference point and surface may be used for indicating the linear measurements, the meters of said instruments being graduated in units of circular measurements for indicating the change in linear distance between the surface and reference point as related to the relative angular movement thereof. Additional instruments may be arranged around the surface for determining and compensating for tiliting, shifting or other change of position of the axis of rotation or surface to enhance the accuracy of the apparatus.

Other objects of the present invention are to provide for measuring the change in linear distance between a reference point and surface relatively rotatable about an axis whereby the distance increases through 180° of angular movement and decreases through the other 180° of movement in completing a full revolution; to provide an instrument for determining linear measurement with a scale graduated in increments of angular measurements; to provide a surface and reference point spaced therefrom and relatively rotatable about an axis whereby the linear distance between the surface and point on a line having a fixed relationship to the axis of rotation, varies in proportion to the cosine of the angle of relative rotation; and to provide an apparatus and method of determining relative angular movement quickly and accurately.

In accomplishing these and other objects of the present invention, I have provided improved details of structure, the preferred forms of which are illustrated in the accompanying drawings, wherein:

Fig. 4 is a vertical sectional view through the relatively rotatable members with an electronic measuring device for indicating the relative angular movement.

3

Figure 5:
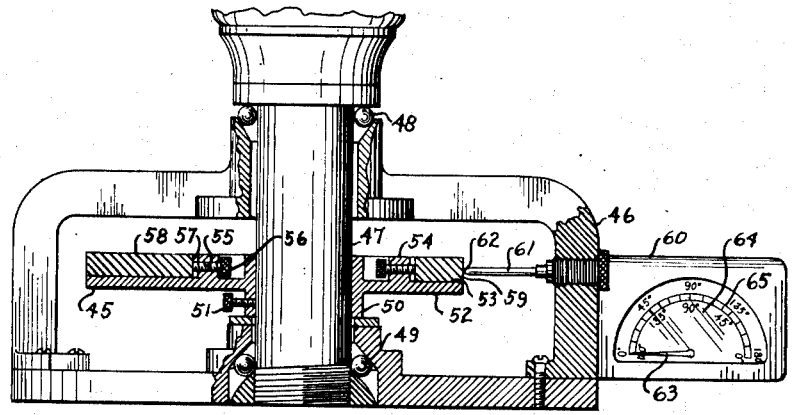

Fig. 5 is a vertical section through relative rotatable members illustrating a modified form as to the positioning of the surface and measuring device.

Figure 6:
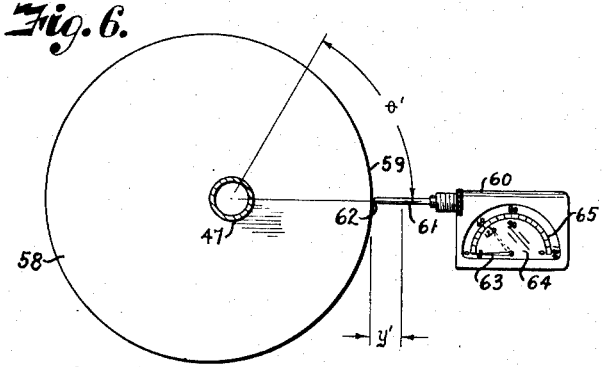

Fig. 6 is a plan view of the structure illustrated in Fig. 5.

Figure 7:
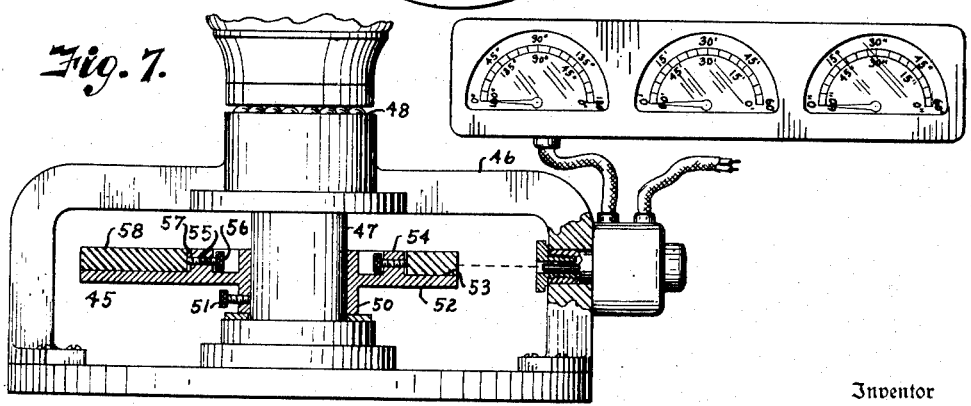

Fig. 7 is a vertical section through the structure illustrated in Fig. 5 with an electronic measuring device.

Referring more in detail to the drawings:

1 designates apparatus having relatively rotatable members 2 and 3 in which it is desirable to accurately determine the relative angular movement of said members. In the form illustrated in Fig. 1 the member 2 is preferably stationary and consists of spaced, aligned bearing members 4 and 5 suitably connected by a plurality of arms 6 to form a rigid structure. The lower bearing member 5 includes an annular flange 7 adapted to be secured to a suitable support. The bearing members 4 and 5 are preferably provided with coaxial bores 8 and 9 respectively adapted to receive suitable bearing 10 for rotatably supporting a shaft 11 therein. Any suitable bearing arrangement may be used, however, it is preferable that it be such that there is substantially no lateral or longitudinal movement of the shaft relative to the member 2. One such arrangement is illustrated wherein the upper end of the bore 8 is provided with a conical counterbore forming a seat for ball bearings 10 adapted to be engaged by a shoulder 13 of a head 14 mounted on the shaft 11. The lower end of the bearing member 5 is provided with a counterbore 15 terminating in a conical seat 16 oppositely arranged to the seat 12 and adapted to receive balls 10 engaging the shaft 11 to rotatably support the lower end thereof. The portion of the shaft 11 in the counterbore 15 is threaded as at 17 to adjustably mount a nut 18, the outer periphery of which is suitably shaped to engage the balls 10 whereby screwing of the nut on the shaft will draw the shoulder 13 into engagement with the balls in the seat of the upper bearing 4 and retain the balls 10 in the lower bearing between the seat 16 and the nut 18 to substantially eliminate any lateral or longitudinal movement of the shaft 11.

A collar 19 having a bore 20 is sleeved on the shaft 11 and located between the bearings 4 and 5, the bore 20 being of such size that the collar closely fits the shaft 11 yet is rotatable thereon. A washer 21 is preferably interposed between the lower end of the collar 19 and the upper end of the bearing member 5 to substantially maintain the position of said collar relative to the bearing member. Suitable fastening means 22 is arranged in the collar and adapted to engage the shaft to lock the collar against relative movement thereon. The upper end of the collar 19 is provided with a flange 23, the upper surface 24 of which is preferably cut on a plane intersecting the axis of the shaft at an angle. Suitably secured on the flange 23 is a disk-like member 25 having a bore 26 through which the shaft 11 extends. The member 25 preferably has parallel faces 27 and 28 which are substantially optically flat whereby the upper face 27 is substantially parallel to the plane of the face 24 of the flange 23.

Suitably mounted on the member 2, for example on a flange 29 extending outwardly from the upper bearing 4, is a linear measuring device 30 having a spindle 31 vertically movable therein. The spindle 31 is movable on a line parallel with the axis of the shaft 11 and is spaced therefrom

4 whereby said line will intersect the surface 27 of the disk 25 regardless of the relative rotational movement of the shaft 11. In the form of the invention illustrated in Fig. 1 the lower end of the spindle 31 engages the surface 27 as at 32, and relative rotation of the members 2 and 3 varies the distance between the measuring device 30 and surface 27 to effect movement of the spindle 31 on the line 33. Movement of the spindle 31 actuates suitable mechanism in the measuring device 30 whereby a pointer 34 moves relative to graduation lines 35 on a dial 36. The mechanism in the device 30 effects amplification of the movement of the spindle 31, thereby increasing the relative movement of the pointer 34. The graduations 35 are in degrees and fractions thereof suitably spaced whereby relative rotation of the members 2 and 3 through an angle, for example, of one degree will effect a longitudinal movement of the spindle to the extent of the change in the spacing between measuring device and the surface 27 at the point of intersection of the line 33. This change in linear spacing and movement of the spindle 31 is amplified in the device 30 to move the pointer 34 over the graduations 35 on the dial 36 sufficiently to indicate one degree.

Figure 2:
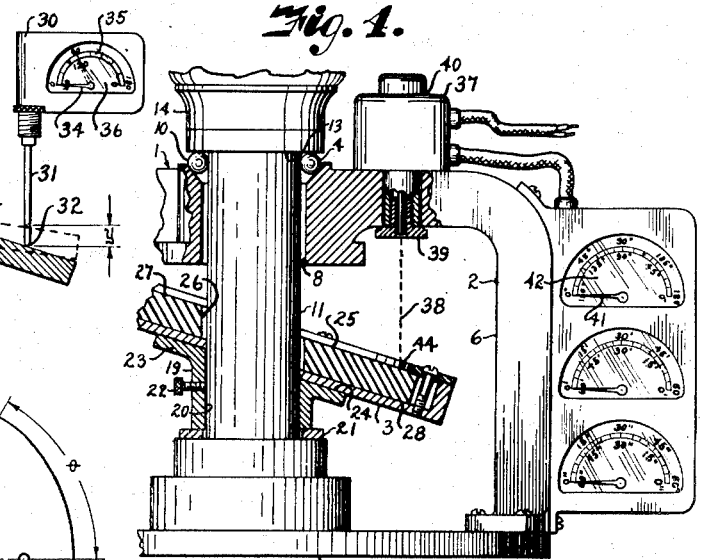
Fig. 2 is an elevation of the relatively rotatable member illustrating in dotted lines a change in linear distance due to relative rotation.
Figure 3:
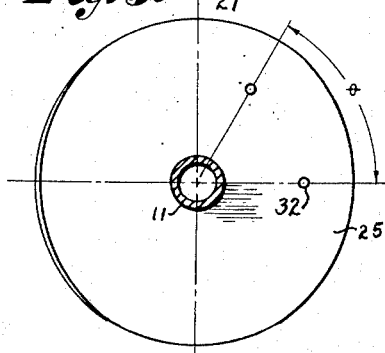
Fig. 3 is a plan view of the relative rotatable members illustrating the angle of relative rotation corresponding to the position of the members as shown in Fig. 2.

In using an apparatus constructed as described for determining the angle of relative rotation of the members 2 and 3, the fastening device 22 is loosened and the collar 19, together with the disk 25, is rotated on the shaft 11 till the spacing between the point of intersection of the line 33 and the surface 27 is such that the spindle 31 moves the pointer 34 to the zero reading of the dial 36. The fastening device 22 is then tightened to secure the collar 19 to the shaft 11 whereby movement of the member 3 effects rotation of the disk 25. As the member 3 is rotated relative to the member 2 as shown in Figs. 2 and 3 the change in linear measurement from point of intersection 32 of the line 33 and the face 27 from the instrument 30 results in movement of the spindle 31 to actuate the mechanism in the device 30 to move the pointer 32 over the dial 36 to indicate by the graduations 35 the degrees and fractions thereof of said relative angular movement and the operator can read directly on the dial 36 the extent of said movement, thereby quickly and accurately making recordings as to said relative angular movement. Obviously the size of the dial 36 and the extent of the amplification of the movement of the spindle 31 in effecting movement of the pointer 34 may be such that very small relatively angular movement can be read directly without interpolation.

Figure 1:
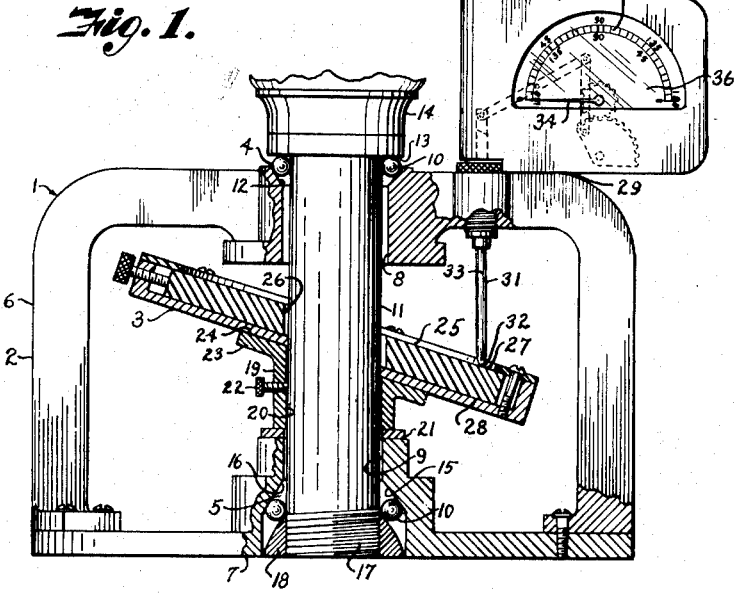
Fig. 1 is a vertical sectional view through relatively rotatable members with a linear measuring device indicating the relative angular movement.

In the form of the invention illustrated in Fig. 4, the structure of the members 2 and 3 is identical with the structure illustrated in Fig. 1. The measuring instrument 37 is of the electronic type capable of directing a beam substantially on the line 38, which beam is reflected by the surface of the disk to a receiver 39 for energizing suitable electronic mechanism in the housing 40 of said instrument, the energization of said mechanism effecting movement of pointers 41 on dials 42 graduated in degrees, minutes and seconds to indicate the relative angular movement of the members 2 and 3. Such an instrument accurately measures the linear spacing between the point 44 on the surface of the disk where the beam strikes same and the reference point or receiver of the instrument. The variation in linear dimension is indicated by the movement of the pointer but the graduation on the dials is such that a predetermined change in the spacing indicates in angular measurement the relative rotation of said members 2 and 3. The actual operation of the device illustrated in Fig. 3 is substantially the same as that of the device illustrated in Fig. 1. Obviously any accurate linear measuring device may be used and suitably graduated in degrees and fractions thereof in accordance to the relative positioning of the measuring device, the surface of the disk and the change in linear spacing in response to predetermined angular relative movement.

In the form of the invention illustrated in Fig. 5 the apparatus consists of relatively rotatable members 45 and 46, said member 45 being carried on a shaft 47 rotatably mounted in spaced bearings 48 and 49. Rotatable on the shaft 47 is a collar 50 having a suitable fastening device 51 for selectively securing said collar to the shaft. The collar includes a plate member 52 having an upper face 53 arranged in a plane perpendicular to the axis of the shaft 47, said plate having an upstanding flange 54 concentric with the shaft, and provided with threaded apertures 55 for mounting adjusting screws 56 arranged radially and adapted to engage the bore 57 of a disk member 58 seated on the face 53 of the plate 52. The outer periphery 59 of the disk 58 is cylindrical and said bore 57 is eccentric thereto whereby the periphery 59 forms a cylindrical surface parallel to the axis of the shaft 47 and eccentric thereto, the eccentricity being adjustable by the screws 56. A suitable measuring device 60 is rigidly secured to the member 46 and provided with a spindle or the like 61 arranged for movement on a line radially of the axis of the shaft 47 and intersecting the peripheral surface 59 as at 62 substantially midway the height of the disk 58 and perpendicular to said surface. The measuring device 60 is adapted to measure the lineal spacing between the peripheral surface 59 and a suitable reference point, or the difference in said spacing effected by relative rotation of the members 45 and 46. Said difference is amplified by suitable mechanism in the measuring device 60 and indicated by movement of a pointer 63 over a suitable dial 64 having graduations 65 suitably spaced to indicate the relative angular rotation of the members 45 and 46 in degrees or other suitable angular measurements. Relative angular movement or rotation about the axis of the shaft 47 changes the linear distance between a reference point and the surface of the periphery 59 whereby the linear distance increases to 180° of angular movement and decreases through the other 180° in completing the full relative revolution. By relating this change in linear distance to said angular movements and graduating the dial 64 accordingly the instrument is capable of accurately measuring the relative angular movement in degrees and fractions thereof. Obviously any suitable meter and linear measuring device, for example an electronic device as shown in Fig. 7 may be used and the dial calibrated in increments of angular measurement.

What I claim and desire to secure by Letters Patent is:

1. Apparatus for measuring angular movement of rotation of relatively rotatable members comprising, a stationary member, a rotatable member, bearing means on the stationary member supporting the rotatable member for rotation about a defined axis and retaining same against relative lateral and longitudinal movement, a plane surface on one of said members at a predetermined fixed angle to the axis of rotation, said plane intersecting said axis, a reference point on the other member positioned whereby said plane surface progressively approaches said reference point through 180° of rotation of the rotatable member and progressively recedes from said reference point in the other 180° of rotation in completing one revolution of the rotatable member, means for measuring the linear distance between the reference point and plane surface on a line parallel to the axis and at a constant radius therefrom, and means responsive to change in the linear measurement resulting only from relative rotation of said members for indicating the relative angular movement of said members.

2. Apparatus for measuring angular movements of rotation of relatively rotatable members comprising, a pair of members, bearing means on one of the members and mounting the other member for relative rotation about a defined axis, said bearing means retaining said other member against relative lateral and longitudinal movement, a reference point fixed on said one member in spaced relation to said axis, a plane surface on said other member at a predetermined fixed angle to the axis of rotation and intersecting said axis whereby said plane surface progressively approaches said reference point through 180° of rotation of the rotatable member and progressively recedes from said reference point in the other 180° of rotation in completing one revolution of the rotatable member, means on said one member for measuring the linear distance between the reference point and said plane surface, said linear distance being changed only by relative rotation of asid members, and means in said measuring means for indicating difference in linear distance in increments of angular measurement to show the extent of relative angular movement of said members.

3. Apparatus for measuring angular movement of rotation of relatively rotatable members comprising, a pair of members, bearing means on one of the members and mounting the other member for relative rotation about a defined axis, said bearing means retaining said other member against relative lateral and longitudinal movement, a reference point fixed on said one member in spaced relation from the axis of rotation, a plane surface on said other member at a predetermined fixed angle to the axis of rotation and intersecting said axis whereby said plane surface progressively approaches said reference point through 180° of rotation of the rotatable member and progressively recedes from said reference point in the other 180° of rotation in completing one revolution of the rotatable member, means on said one member for measuring the linear distance between the reference point and said plane surface, said linear distance being changed only by relative rotation of said members, dial means graduated in increments of angular measurements, and means in said measuring means for amplifying the difference in linear distance and indicating same on said dial whereby said difference in linear distance as indicated on the dial shows the extent of relative angular movement of said members.

4. Apparatus for measuring angular movement of rotation of relatively rotatable members comprising, a stationary member, a rotatable member, bearing means on the stationary member supporting the rotatable member for rotation about a defined axis, said bearing means retaining said rotatable member against relative lateral and longitudinal movement, a reference point fixed on said stationary member in spaced relation to said axis of rotation, a plane surface on said rotatable member at a predetermined fixed angle to the axis of rotation and intersecting said axis, whereby said surface progressively approaches the reference point through 180° of rotation of the rotatable member and progressively recedes from said reference point in the other 180° of rotation in completing one revolution of the rotatable member, means on said stationary member for measuring the linear distance between the reference point and said plane surface, said linear distance being changed only by relative rotation of said members, the difference in linear distance resulting from relative rotation being proportioned to the cosine of the relative angle of rotation, dial means graduated in increments of angular measurement, and means in said measuring means for amplifying the difference in linear distance and indicating same on said dial whereby said difference in linear distance as indicated on the dial shows the extent of relative angular movement of said members.

WILLIAM D. MOORE.

References Cited in the file of this patent

UNITED STATES PATENTS

| Number | Name | Date |
|---|---|---|
| 1,385,910 | Fox | July 26, 1921 |
| 1,463,440 | Pichler | July 31, 1923 |
| 1,513,641 | Simmons | Oct. 28, 1924 |
| 1,637,482 | Graves | Aug. 2, 1927 |
| 1,823,719 | Baker | Sept. 15, 1931 |
| 2,019,741 | Steckel et al. | Nov. 5, 1935 |
| 2,177,399 | Aller | Oct. 24, 1939 |
| 2,322,278 | Buckwalter | June 22, 1943 |
| 2,324,476 | Becker | July 20, 1943 |
| 2,331,987 | Leatherman | Oct. 19, 1943 |
| 2,349,552 | Holmes | May 23, 1944 |
| 2,366,394 | Gerber | Jan. 2, 1945 |
| 2,408,689 | Seme | Oct. 1, 1946 |
| 2,461,143 | Clifford | Feb. 8, 1949 |

FOREIGN PATENTS

| Number | Country | Date |
|---|---|---|
| 408,394 | Great Britain | Apr. 12, 1934 |
| 815,016 | France | July 5, 1937 |